United States Patent [19]
Masuda et al.

[11] Patent Number: 5,297,221
[45] Date of Patent: Mar. 22, 1994

[54] IMAGE SIGNAL PROCESSING APPARATUS

[75] Inventors: Kazuya Masuda, Nara; Kouji Yamaji, Yamato-Koriyama, both of Japan

[73] Assignee: Sharp Kabushiki Kaisha, Osaka, Japan

[21] Appl. No.: 8,385

[22] Filed: Jan. 25, 1993

Related U.S. Application Data

[63] Continuation of Ser. No. 707,115, May 29, 1991, abandoned.

[30] Foreign Application Priority Data

May 30, 1990 [JP] Japan .................................. 2-142126

[51] Int. Cl.$^5$ ............................................. G06K 9/38
[52] U.S. Cl. ...................................... 382/50; 382/53; 358/466
[58] Field of Search ................................ 382/50–54; 358/458, 461, 463, 464, 465, 466; G06K 9/38, 9/40; H04N 1/40, 1/04

[56] References Cited

U.S. PATENT DOCUMENTS

| | | | |
|---|---|---|---|
| 4,525,747 | 6/1985 | Sakai et al. | 382/53 |
| 4,554,593 | 11/1985 | Fox et al. | 358/466 |
| 4,709,274 | 11/1987 | Tanioka | 382/53 |
| 4,710,822 | 12/1987 | Matsunawa | 382/53 |
| 4,760,541 | 7/1988 | Weygant et al. | 364/724 |

FOREIGN PATENT DOCUMENTS

| | | |
|---|---|---|
| 0280412 | 8/1988 | European Pat. Off. . |
| 58-010963 | 1/1983 | Japan . |
| 60-236580 | 11/1985 | Japan . |
| WO90/07751 | 12/1989 | PCT Int'l Appl. . |

OTHER PUBLICATIONS

European Search Report dated Nov. 12, 1992.
Sekikawa, K., "Picture Compensation Processing Method" Jan. 21, 1983 (English Abstract).
Nagaoka, T., "Picture Processor", Nov. 25, 1985 (English Abstract).

*Primary Examiner*—Jose L. Couso
*Attorney, Agent, or Firm*—David G. Conlin; George W. Neuner

[57] ABSTRACT

An image signal processing apparatus is provided with an image signal generation device for sequentially generating image signals representing light and shade of an original image per every picture element. The image signal processing apparatus is also provided with an extreme portion detection device for comparing the generated image signal of an observation picture element and each of the generated image signals of a plurality of peripheral picture elements which are positioned in the vicinity of the observation picture element, and judging whether the compared observation picture element is an extreme portion or not. The image signal processing apparatus is further provided with a correction device for correcting a level of the image signal of the observation picture element, which is judged to be the extreme portion by the extreme portion detection device, by use of a calculation predetermined with respect to the level of the image signal.

6 Claims, 6 Drawing Sheets

Fig. 1
Fig. 1a
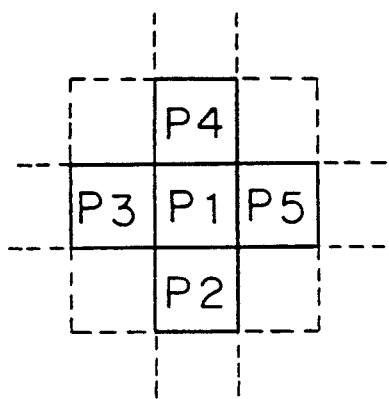
Fig. 1b
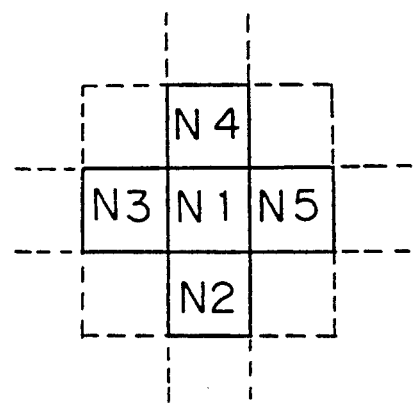
Fig. 2
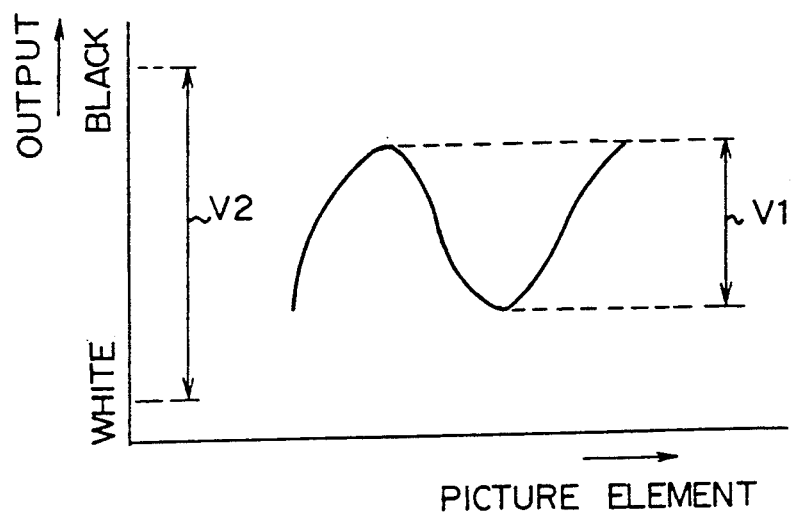

Fig. 3
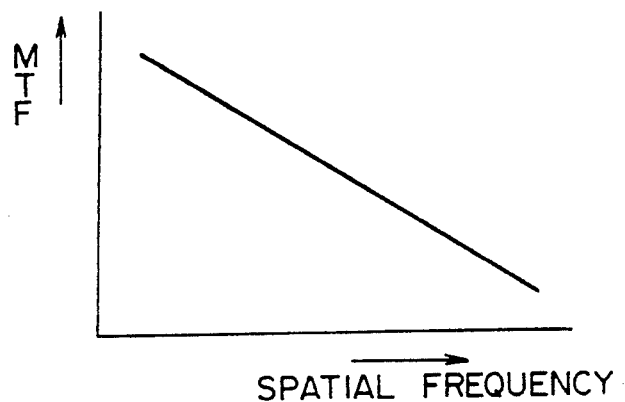
Fig. 4
Fig. 4a
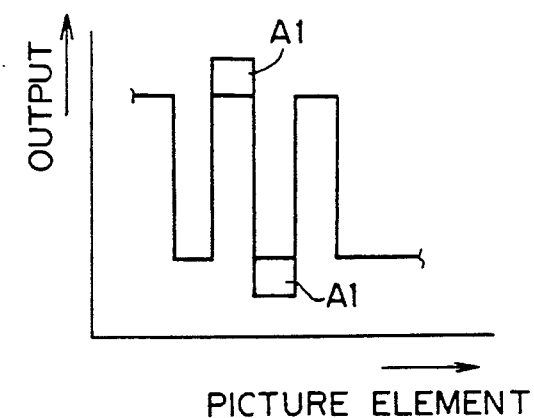
Fig. 4b
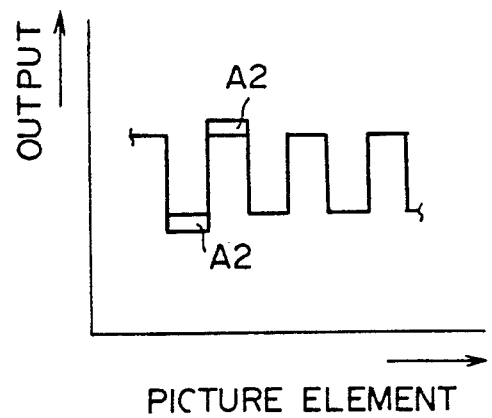

Fig. 5
Fig. 5a
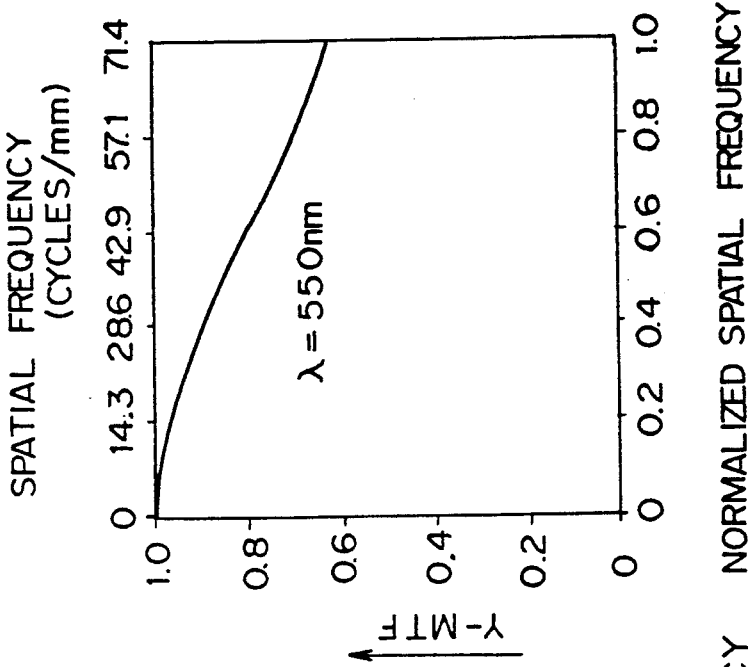
Fig. 5b
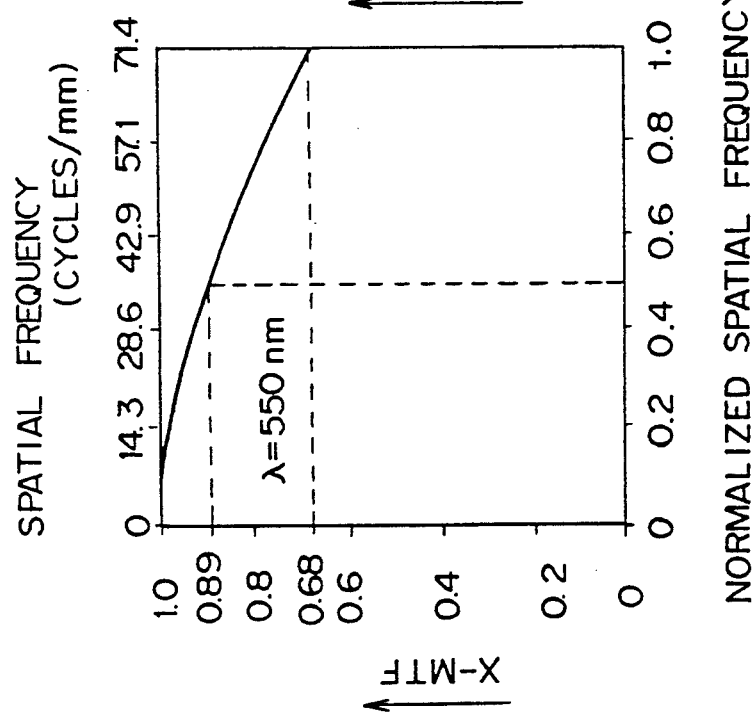

Fig. 8
Fig. 8a
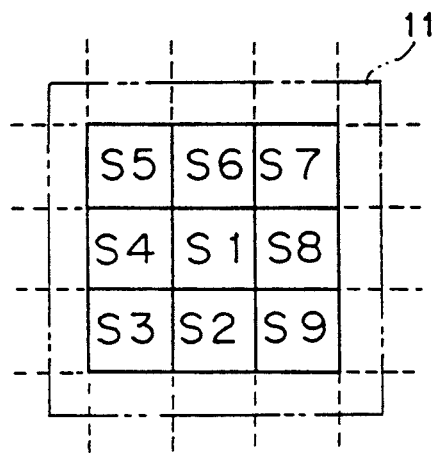
Fig. 8b
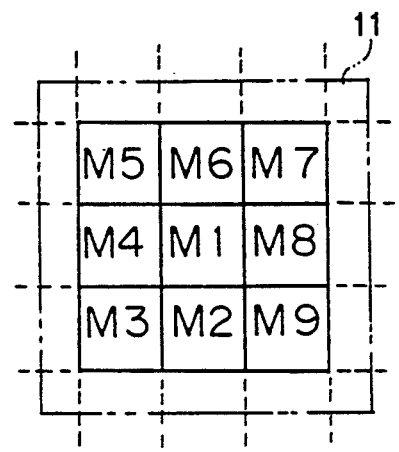
Fig. 9
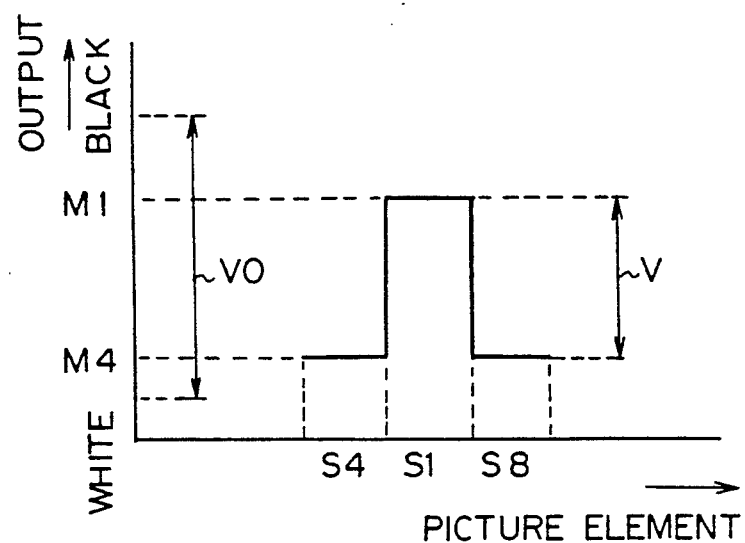

IMAGE SIGNAL PROCESSING APPARATUS

This is a continuation of copending application Ser. No. 07/707,115 filed on May 29, 1991, now abandoned.

BACKGROUND OF THE INVENTION

1. Field of the Invention

The present invention relates to an image signal processing apparatus, which can be suitably used in an optical image reading apparatus of a facsimile apparatus, an image scanner, a copying apparatus and so on.

2. Description of the Related Arts

In such an optical image reading apparatus, a reflected light from an illuminated original is detected by an image reading sensor, and its sensed image signal is inputted to the image signal processing apparatus so as to form an image data corresponding to the original image. In the image signal processing apparatus, the MTF (Modulation Transfer Function) correction method may be employed so as to make the image data more precise with respect to the original image. FIG. 1 are schematic views to explain the MTF correction method.

In FIG. 1a, there are indicated picture elements P1 to P5, while there are indicated outputs N1 to N5 of the corresponding picture elements P1 to P5. Supposing that the picture element P1 is observed, the output N1 of the picture element of interest P1 is influenced by leaking out components from the peripheral picture elements P2 to P5 disposed adjacent in up-and-down and left-right directions with respect to the central picture element P1, and also by a leaking-out component from the picture element P1.

Accordingly, the relationship between the output N1 of the picture element of interest P1 and a true value N0, which is an ideal value corresponding to the real light and shade of the original image at the picture element of interest P1, is established as the following expression (1), $$N1 = N0 - 4K^*N0 + K(N2 + N3 + N4 + N5) \quad (1)$$

wherein, K represents the correction coefficient which value is peculiarly determined by the relevant optical system.

Thus, the true value N0 can be expressed by the following expression (2) from the expression (1).

$$N0 = \{N1 - K(N2 + N3 + N4 + N5)\}/(1 - 4K) \quad (2)$$

In the aforementioned image signal processing apparatus, the MTF correction is performed as for the output N1 according to this expression (2), and thus corrected output is assumed as the true value N0 and utilized in following image signal processes.

The mutual relationship between the correction amount of the MTF correction method and the image signal level is expressed by the following expression (3), $$N0 - N1 = [\{N1 - K(N2 + N3 + N4 + N5)\}/(1 - 4K)] - N1 \quad (3)$$

wherein, (N0−N1) represents the MTF correction amount.

Thus, the following expression (4) can be obtained from the expression (3), $$N0 - N1 = \{-K(N2 + N3 + N4 + N5 - 4N1)\}/(1 - 4K) \quad (4)$$

wherein, the correction coefficient K is in the range as the following expression (5).

$$0 < K < 1 \quad (5)$$

Accordingly, the larger is the difference between the output N1 of the central picture element P1 and the outputs N2 to N5 of the peripheral picture elements, the larger is the correction amount (N0−N1).

FIG. 2 is a graph to explain the MTF. As shown in FIG. 2, supposing that an ideal output difference between a white picture element and a black picture element is V2, and that a detected output difference obtained at the time of the actual detection is V1, the MTF can be expressed by the following expression (6).

$$MTF = V1/V2 \quad (6)$$

FIG. 3 shows the relationship between the MTF and a spatial frequency of the original image. As shown in FIG. 3, the MTF decreases as the spatial frequency increases. Thus, as the spatial frequency increases, the output difference between the central picture element (P1 in FIG. 1a) and the peripheral picture elements (P2 to P5 in FIG. 1a), decreases.

Accordingly, the purpose of the output correction performed in the optical image reading apparatuses, is in fact to compensate the diminished component due to the increase of the spatial frequency. More specifically, the purpose is to increase the output level difference in case that the output level difference is diminished due to the increase of the spatial frequency. Two examples of the relationships between the picture elements and the output levels are illustrated with the MTF correction amounts A1, A2, in FIG. 4.

In the optical image reading apparatus, it is desirable to make the output correction as for each picture element, regardless of the variation or pattern of the light and shade of the original image. However, according to the abovementioned MTF correction method, the MTF correction amount A1 becomes large when the output level difference between the peripheral picture elements is large as shown in FIG. 4a, while the MTF correction amount A2 becomes small when the output level difference between the peripheral picture elements is small as shown in FIG. 4b, resulting in the drawback that an ideal output correction cannot be always performed.

FIG. 5 are graphs each showing the MTF characteristic of a CCD (Charged Coupled Device) image sensor with respect to a light of the wavelength 550 nm. More particularly, the relationship between the MTF in the X direction (X-MTF) and the normalized spatial frequency as well as the spatial frequency without normalization is shown in FIG. 5a, while the relationship between the MTF in the Y direction (Y-MTF) and the normalized spatial frequency as well as the spatial frequency without normalization is shown in FIG. 5b. Here, the X direction is a direction along the array of the CCD sensor, while the Y direction is perpendicular to the X direction along the original plane.

In FIG. 5a, on one hand, when the normalized spatial frequency is 0.5, the MTF is 0.89. On the other hand, when the normalized spatial frequency is 1.0 i.e. at the Nyquist limit, the MTF is 0.68. This CCD MTF characteristic of FIG. 5a is listed in Table. 1.

The MTF characteristic of a lens is also listed in Table. 1. Namely the lens MTF is 0.79 when the normalized spatial frequency is 1.0, while it is 0.94 when the normalized spatial frequency is 0.5. Here, since a total MTF characteristic of an combinational optical system of such a CCD image sensor and a lens, is equal to their product, this total MTF characteristic is 0.54 when the normalized spatial frequency 1.0, while it is 0.84 when the normalized spatial frequency is 0.5, as also listed in Table. 1.

TABLE 1

| NORMALIZED SPATIAL FREQUENCY | CCD MTF | LENS MTF | TOTAL MTF |
|---|---|---|---|
| 1.0 | 0.68 | 0.79 | 0.54 |
| 0.5 | 0.89 | 0.94 | 0.84 |

In general, the MTF characteristic is regarded to be sufficient when the MTF is not less than 0.6, with respect to an ordinary optical image reading operation. However, as shown in Table 1, when the normalized spatial frequency is 1.0, the total MTF is as low as 0.54. That is to say, a sufficient output can not be obtained. As for the MTF in the Y direction (Y-MTF) shown in FIG. 5b, the situation is also similar.

Consequently, there is a problem that an image defect and an image destruction are caused upon encountering the Nyquist limit, i.e. the limit of the image resolution inherent to the sampling manner of the picture element, and thus an image input operation precisely corresponding to the original image is difficult to perform according to the above-mentioned signal image processing apparatus.

SUMMARY OF THE INVENTION

It is therefore an object of the present invention to provide an image signal processing apparatus, which can correct an image signal so as to make it precise with respect to the light and shade of the original image, even if the condition of the Nyquist limit, in which the MTF is severely degraded, is encountered in an image reading operation.

According to the present invention, the above-mentioned object can be achieved by an image signal processing apparatus provided with an image signal generation device for sequentially generating image signals representing light and shade of an original image per every picture element. The image signal processing apparatus is also provided with an extreme portion detection device for comparing the generated image signal of an picture element of interest and each of the generated image signals of a plurality of peripheral picture elements which are positioned in the vicinity of the picture element of interest, and judging whether the compared picture element is an extreme portion or not. The image signal processing apparatus is further provided with a correction device for correcting a level of the image signal of the picture element of interest, which is judged to be the extreme portion by the extreme portion detection device, by use of a calculation predetermined with respect to the level of the image signal.

In the image signal processing apparatus, the image signal representing the light and shade of the original image from the image signal generation device is given to the extreme portion detection device. The extreme portion detection device judges whether the picture element of interest is an extreme portion or not by comparing the generated image signal of the picture element of interest and each of the generated image signals of a plurality of the peripheral picture elements. The peripheral picture elements are positioned in the vicinity of the picture element of interest. Namely, the extreme portion detection device judges whether the level of the image signal of the picture element of interest is higher or lower than each levels of the image signals of each pair of the peripheral picture elements, which are positioned facing each other with the picture element of interest therebetween, for example. Here, if the level of the image signal of the picture element is higher, the picture element of interest is judged to be the local maximum portion, while it is judged to be the local minimum portion if the level of the image signal of the picture element of interest is lower. When the picture element of interest is judged to be the extreme portion i.e. the local maximum or minimum portion, the correction device corrects the level of the image signal of the picture element of interest by use of the calculation predetermined with respect to the level of the image signal. That is to say, the correction of the level of the image signal is performed when the picture element of interest is the extreme portion i.e. when the sequential image signals have the spatial frequency at the limit of the image resolution inherent to the sampling manner of the picture element.

Accordingly, the degradation in the level of the image signal at the limit of the image resolution, can be prevented, and thus the image defect and the image destruction upon encountering the limit of the image resolution can be effectively prevented by the present invention.

Further objects and advantages of the present invention will be apparent from the following description of the preferred embodiment of the invention as illustrated in the accompanying drawings.

BRIEF DESCRIPTION OF THE DRAWINGS

FIG. 1, which are composed of FIGS. 1a and 1b, are schematic views to explain the MTF correction method;

FIG. 2 is a graph to explain the MTF;

FIG. 3 is a graph showing the relationship between the MTF and the spatial frequency of the original image;

FIG. 4, which are composed of FIGS. 4a and 4b, are graphs each showing the relationship between the output level and the picture element with the MTF correction amount;

FIG. 5, which are composed of FIGS. 5a and 5b, are graphs each showing the MTF characteristic of a CCD sensor;

FIG. 8, which are composed of FIGS. 8a and 8b, are schematic views to explain the correction method performed in the image signal processing apparatus of FIG. 6; and FIG. 9 is a graph showing the relationship between the picture element and the output in the optical image reading apparatus of FIG. 6.

DETAILED DESCRIPTION OF THE PREFERRED EMBODIMENT

A preferred embodiment of the present invention will be described below with reference to the accompanying drawings.

Figure 6:
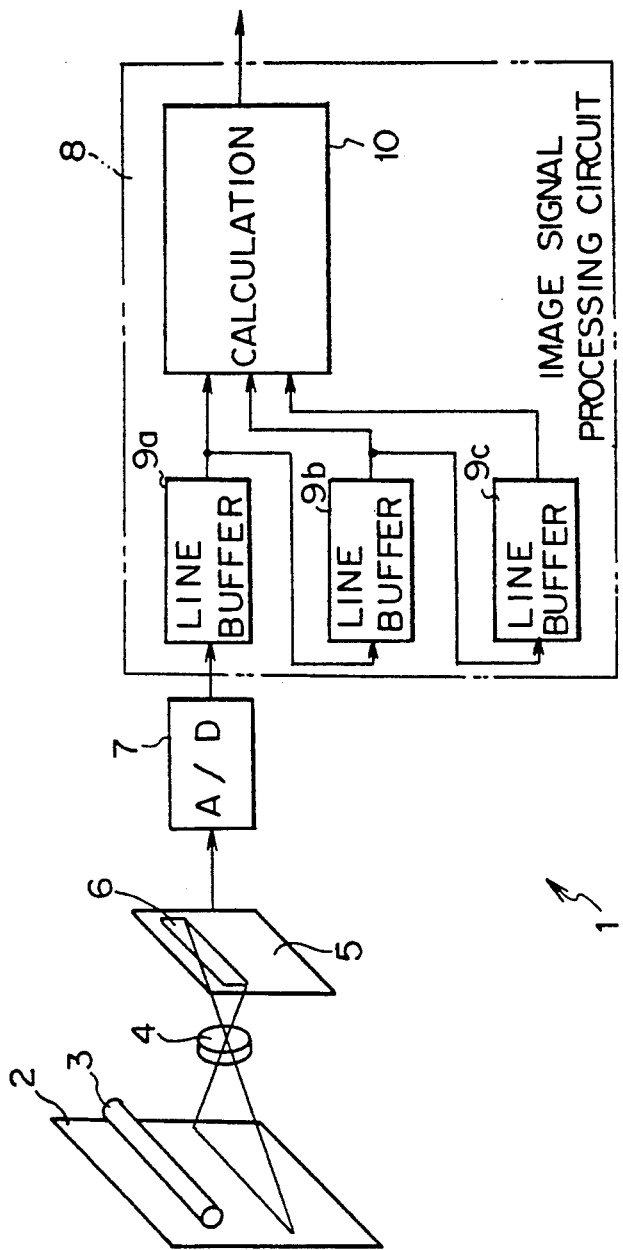
FIG. 6 is a block diagram showing a basic construction of an optical image reading apparatus including an image signal processing apparatus as the preferred embodiment of the present invention.

FIG. 6 is a block diagram showing a basic construction of an optical image reading apparatus including an image signal processing apparatus as the preferred embodiment of the present invention.

In FIG. 6, an optical image reading apparatus 1 of a facsimile apparatus, an image scanner, a copying apparatus and so on, is provided with a light source 3, a lens 4, and an image reading device 5. A light source 3, such as a fluorescent lamp for example, is adapted to generate a light onto an original 2, which has an original image and is set to the image reading position of the optical image reading apparatus 1. The lens 4 is adapted to collected a reflected light from the original 2 toward the image reading device 5. The image reading device 5 is provided with a solid state image reading element 6, such as a CCD array sensor for example, at a position to receive the reflected light through the lens 5. The image reading device 5 outputs an analog image signal, which is received by the image reading element 6 and corresponds to the light and shade of the original image of the original 2.

The optical image reading apparatus 1 is also provided with an A/D (Analog to Digital) converter 7 and an image signal processing circuit 8. The A/D converter 7 is connected to the image reading device 5, and receives the analog image signal from the image reading device 5. The A/D converter is adapted to convert the analog signal to a digital image signal, and output it to the image signal processing circuit 8.

The image signal processing circuit 8, which may consist of a microcomputer for example, includes a plurality of line buffers 9a, 9b, 9c and a calculation circuit 10. Each of the line buffers 9a, 9b, 9c is adapted to sequentially store the digital image signal corresponding to one line image data of the image reading element 6.

The digital image signal from the A/D converter 7 is inputted to the line buffer 9a. The line image data of the line buffer 9a is given to the calculation circuit 10 and the line buffer 9b. The line image data of the line buffer 9b is given to the calculation circuit 10 and the line buffer 9c. The line image data of the line buffer 9c is given to the calculation circuit 10. The calculation circuit 10 is adapted to perform an image signal correction by use of the line image data from the line buffers 9a, 9b, 9c, according to the calculation procedure as described hereinbelow in detail, with reference to FIGS. 6 to 9.

Figure 7:
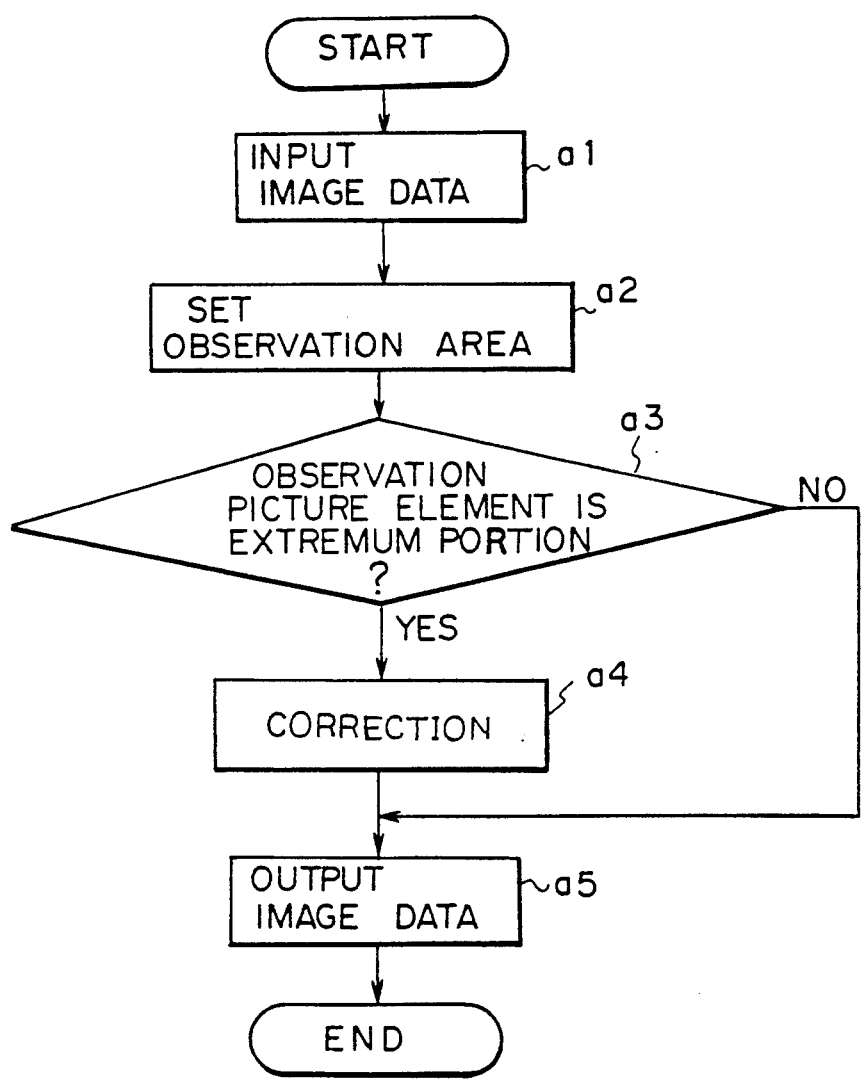
FIG. 7 is a flow chart showing an operation of the image signal processing apparatus of FIG. 6.

FIG. 7 is a flowchart showing an operation of the calculation process by the calculation circuit 10, while FIG. 8 is a schematic view to explain the operation of the image signal correction. In FIG. 8, reference numerals M1 to M9 in FIG. 8b designate outputs of corresponding picture elements S1 to S9 in FIG. 8a, respectively in an observation area 11, i.e. area of interest.

In FIG. 7, when the optical image reading operation is started, the line image data is inputted from the line buffers 9a, 9b, 9c to the calculation circuit 10 (step a1). Then, the area 11 including the observation picture element of interest S1 and the peripheral picture elements S2 to S9 which are respectively adjacent to the picture element S1 in up-and-down, left-and-right, and oblique directions, is set (step a2) as shown in FIG. 8.

Then, at the step 3, it is judged whether the picture element S1 is an extreme portion or not, according to the outputs M1 to M9. Namely, on one hand, the judgement whether it is a local maximum portion or not, is performed by use of the following expressions (7) to (10).

$$M1>M2 \text{ and } M1>M6 \quad (7)$$

$$M1>M3 \text{ and } M1>M7 \quad (8)$$

$$M1>M4 \text{ and } M1>M8 \quad (9)$$

$$M1>M5 \text{ and } M1>M9 \quad (10)$$

Here, when at least two conditions out of the above four conditions prescribed by the expressions (7) to (10) are established, the picture element S1 is judged to be the local maximum portion.

On the other hand, the judgement whether it is a local minimum portion or not, is performed by use of the following expressions (11) to (14).

$$M1<M2 \text{ and } M1<M6 \quad (11)$$

$$M1<M3 \text{ and } M1<M7 \quad (12)$$

$$M1<M4 \text{ and } M1<M8 \quad (13)$$

$$M1<M5 \text{ and } M1<M9 \quad (14)$$

Here, when at least two conditions out of the above four conditions prescribed by the expressions (11) to (14) are established, the observation picture element S1 is judged to be the local minimum portion.

If it is judged that the picture element S1 is not the extreme portion in the step a3 (NO), the flow branches directly to the step a5. If it is judged that the observation picture element S1 is the extreme portion (YES) i.e. the local maximum or minimum portion, according to the expressions (7) to (10), or (11) to (14), the flow branches to the step a4.

At the step a4, the correction of the output M1 of the picture element of interest S1 is performed. At this time, it is supposed that the output degradation is occurring due to the influence of the Nyquist limit, as the picture element S1 is judged to be the extreme portion at the step a3. Hereinbelow, the explanation will be continued on an assumption that the expressions (7) and (9) are established, and thus the observation picture element S1 is judged to be the local maximum portion.

FIG. 9 is a graph showing the relationship between the picture element and the output. The process output V0 is expressed by the following expression (15) based on the expression (6).

$$V0 = V/MTF = M1/MTF \quad (15)$$

On the other hand, the correction amount Vh is expressed by the following expression (16).

$$Vh = K(V0 - V) \quad (16)$$

Accordingly, the output M1h after the correction of the picture element S1 can be expressed by the following expression (17).

$$M1h = M1 + K(M1/MTF - M1) \quad (17)$$

Thus, by modifying the expression (17), the following expression (18) can be obtained, $$M1h = M1 + K^*M1^*(1/MTF - 1) \quad (18)$$

wherein the correction coefficient K and the MTF are peculiar values determined by the characteristic of the combination of the lens 4 and the image reading device 5 (in FIG. 6).

Here, since the MTF is constant at the Nyquist limit, the term (1/MTF − 1) can be substituted by a constant α as the following expression (19).

$$1/MTF - 1 = \alpha \quad (19)$$

Thus, by use of this constant α, the expression (18) can be simplified as the following expression (20).

$$M1h = M1 + \alpha^*K^*M1 \quad (20)$$

Here, the correction coefficient K can be freely set in various values by selecting the combination of the lens 4 and the image reading device 5 (in FIG. 6). Further, the correction coefficient K can be set independently for the local maximum portion and the local minimum portion.

Then, at the step a5 in FIG. 7, the image data is outputted from the calculation circuit. Namely, in case that the picture element of interest S1 is the extreme portion, the output M1 after the correction obtained in the above-mentioned step a4, is outputted. In case that the picture element S1 is not the extreme portion, the output M1 at the time of the optical detection process without the correction is outputted, as it is.

As described above, according to the present embodiment, since the correction is applied to the output level of the picture element upon encountering the Nyquist limit i.e. when the normalized spatial frequency of the image signals is 1.0 and thus the degradation of the MTF characteristic is outstanding, the image defect and the image destruction of the original image read by the image reading device 5 can be effectively prevented at the limit of the image resolution of the image reading device 5, and thus the image input operation at the signal level precisely corresponding to the light and shade of the original image can be enabled. At this time, since the correction can be executed by use of such a simple calculation as the expression (20), and since the correction is not applied to the outputs of the picture elements other than the extreme portions (corresponding to the Nyquist limit), the calculation and the correction process can be easily and speedily performed, resulting in that a speedy image reading operation with high image quality can be realized in the optical image reading apparatus 1.

In the above described embodiment, though each of the picture elements S1 to S9 has a rectangular shape, it may have a triangular shape or a hexagonal shape. Further, the present embodiment can be applied to a full color image reading apparatus, just by separating the reflected light from the original 2 into the three primary colors and by employing three sets of the image signal processing circuit 8 for each of the separated light component.

Many widely different embodiments of the present invention may be constricted without departing from the spirit and scope of the present invention. It should be understood that the present invention is not limited to the specific embodiments described in this specification, except as defined in the appended claims.

What is claimed is:

1. An image signal processing apparatus for correcting an image signal at Nyquist limit, the apparatus comprising;

an image signal generation means for sequentially generating analog image signals representing information on light and shade of an original image per every picture element, said image signal generation means including a lens for receiving light from an original and an image reading device for converting light passing through said lens into said analog image signals;

an analog to digital converting means for converting generated image signals into essentially proportional digital image signals representing the same information of said generated image signals, respectively;

an extreme portion detection means for comparing said converted digital image signal of a picture element of interest and each of said converted digital image signals of a plurality of peripheral picture elements which are positioned in the vicinity of said picture element of interest, and judging whether said picture element of interest is an extreme portion or not thereby detecting a picture element of which a level of a digital image signal is deteriorated due to an influence of the Nyquist limit;

a correction means for correcting a level of said digital image signal of said picture element of interest, if the picture element of interest is judged to be said extreme portion under said influence of the Nyquist limit by said extreme portion detection means, by adding a value proportional to said level of said digital image signal, said correction being accomplished in accord with the expression:

$$M1h = M1 + K^*M1^*(1/MTF - 1)$$

wherein M1 represents an original level of said digital image signal of said picture element of interest, M1h is a corrected level thereof, K is a correction coefficient and MTF is a modulation transfer function, K and MTF being peculiar values determined by the characteristic of the combination of said lens and said image reading device and the MTF being constant at the Nyquist limit; and output means for outputting a corrected digital image signal in case that the picture element of interest is the extreme portion, and outputting an original digital image signal without correction in the case that the picture element of interest is other than the extreme portion.

2. An image signal processing apparatus according to claim 1, wherein said extreme portion detection means is adapted to judge whether said observation picture element is a local maximum portion or a local minimum portion.

3. An image signal processing apparatus according to claim 2, wherein a proportional constant for correction is predetermined differently for said local maximum portion and for said local minimum portion.

4. An image signal processing apparatus according to claim 1, wherein each of said picture elements comprises a rectangular shape, and said peripheral picture elements comprises nine picture elements surrounding said observation picture element.

5. An image signal processing apparatus according to claim 1, wherein said extreme portion detection means compares said generated image signal of said observation picture element and said generated image signals of said peripheral picture elements which are disposed in up-and-down, left-and-right, and oblique directions with respect to said observation picture element.

6. An image signal processing apparatus according to claim 1, wherein said extreme portion detection means and said correction means are composed of a microcomputer.

* * * * *